(12) United States Patent
Belimpasakis et al.

(10) Patent No.: US 9,730,017 B2
(45) Date of Patent: Aug. 8, 2017

(54) METHOD AND APPARATUS FOR AD-HOC PEER-TO-PEER AUGMENTED REALITY ENVIRONMENT

(71) Applicant: Nokia Technologies Oy, Espoo (FI)

(72) Inventors: Petros Belimpasakis, Tampere (FI);
Asta M. Kärkkäinen, Helsinki (FI);
Mikko Aleksi Uusitalo, Helsinki (FI);
Timo Rantalainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/236,003

(22) Filed: Aug. 12, 2016

(65) Prior Publication Data

US 2016/0366553 A1    Dec. 15, 2016

Related U.S. Application Data

(63) Continuation of application No. 12/732,802, filed on Mar. 26, 2010, now Pat. No. 9,417,691.

(51) Int. Cl.
| | |
|---|---|
| *G06F 15/16* | (2006.01) |
| *H04W 4/02* | (2009.01) |
| *G06F 3/01* | (2006.01) |
| *H04L 29/08* | (2006.01) |
| *H04L 29/06* | (2006.01) |
| *H04W 84/18* | (2009.01) |

(52) U.S. Cl.
CPC ............ *H04W 4/021* (2013.01); *G06F 3/011* (2013.01); *H04L 67/18* (2013.01); *H04L 67/38* (2013.01); *H04W 4/023* (2013.01); *H04W 4/027* (2013.01); *H04W 84/18* (2013.01)

(58) Field of Classification Search
CPC ...... G01S 1/68; G01C 21/32; G08B 13/19641; G06F 3/0481; G06F 3/011; H04L 12/1827; H04W 4/023; H04W 4/025
USPC ........... 342/450; 701/425; 709/217; 715/733
See application file for complete search history.

(56) References Cited

U.S. PATENT DOCUMENTS 7,840,903 B1    11/2010  Amidon et al.
9,483,157 B2 *  11/2016  Leacock ............. H04L 12/1827
(Continued)

FOREIGN PATENT DOCUMENTS

CA       2583039 A1      9/2007
DE   102006054741 A1     5/2008
(Continued)

OTHER PUBLICATIONS

Layar, "Augmented Reality", Web Page, retrieved on Jul. 12, 2016 from https://www.layar.com/, 3 Pages.
(Continued)

*Primary Examiner* — Dustin Nguyen
(74) *Attorney, Agent, or Firm* — Ditthavong & Steiner, P.C.

(57) ABSTRACT

Methods and apparatuses are provided for providing augmented reality client application content to be enabled for one or more nodes. A method may include specifying a bounded area of a mesh network and associating content with the bounded area. The method may additionally include causing, at least in part, a peer-to-peer transmission of the content to one or more nodes within the bounded area over the mesh network. Corresponding apparatuses are also provided.

20 Claims, 15 Drawing Sheets

(56) References Cited

U.S. PATENT DOCUMENTS

| | | | |
|---|---|---|---|
| 2006/0095539 A1* | 5/2006 | Renkis | G08B 13/19641 709/217 |
| 2006/0173614 A1* | 8/2006 | Nomura | G01C 21/32 701/425 |
| 2007/0037568 A1 | 2/2007 | Warner et al. | |
| 2007/0230482 A1 | 10/2007 | Shim et al. | |
| 2008/0252527 A1* | 10/2008 | Garcia | G01S 1/68 342/450 |
| 2009/0003662 A1 | 1/2009 | Joseph et al. | |
| 2009/0061901 A1 | 3/2009 | Arrasvuori et al. | |
| 2009/0112467 A1 | 4/2009 | Jiang et al. | |
| 2009/0215471 A1* | 8/2009 | Sands | G01S 13/876 455/457 |
| 2009/0265106 A1 | 10/2009 | Bearman et al. | |
| 2009/0265473 A1 | 10/2009 | Hydrie et al. | |
| 2009/0315776 A1 | 12/2009 | Khosravy et al. | |
| 2010/0257450 A1* | 10/2010 | Go | G06F 3/0481 715/733 |
| 2011/0126132 A1 | 5/2011 | Anderson et al. | |
| 2011/0130197 A1 | 6/2011 | Bytnar et al. | |
| 2013/0167196 A1* | 6/2013 | Spencer | H04W 8/22 726/3 |

FOREIGN PATENT DOCUMENTS

| | | |
|---|---|---|
| EP | 1532821 A2 | 5/2005 |
| EP | 1988724 A1 | 11/2008 |
| EP | 2109074 A1 | 10/2009 |
| EP | 2127263 A1 | 12/2009 |
| JP | 2009080079 A | 4/2009 |
| KR | 20020022487 A | 3/2002 |
| WO | 03098815 A2 | 11/2003 |
| WO | 2006017696 A2 | 2/2006 |
| WO | 2007146905 A2 | 12/2007 |
| WO | 2008092475 A1 | 8/2008 |

OTHER PUBLICATIONS

Wikipedia, "List of ad hoc routing protocols", retrieved on Jul. 12, 2016 from https://en.wikipedia.org/wiki/List_of_ad_hoc_routing_protocols, 3 Pages.

Mara, Nokia Research Center, Web Page, pp. 1-3.

Intelligent Automation Inc, "Mobile Ad hoc Networked GPS for Robust Positioning", Proposal No. A062-201-3169, 2 Pages.

Wikitude, "The World's leading Augmented Reality SDK", Web Page, retrieved on Jul. 12, 2016 from http://www.wikitude.com, 4 Pages.

* cited by examiner

FIG. 2F

NETWORK LAYER MESSAGE HEADER 281
- TX 282 (TRANSMITTER NID)
- SRC 283 (SOURCE NID)
- DST 284 (DESTINATION NID)
- MSN 285 (MESSAGE SEQUENCE NUMBER)
- HOP COUNT 286
- GEOGRAPHICAL LIMIT 287
- TEMPORAL LIMIT 288
- CONTEXT LIMIT 289

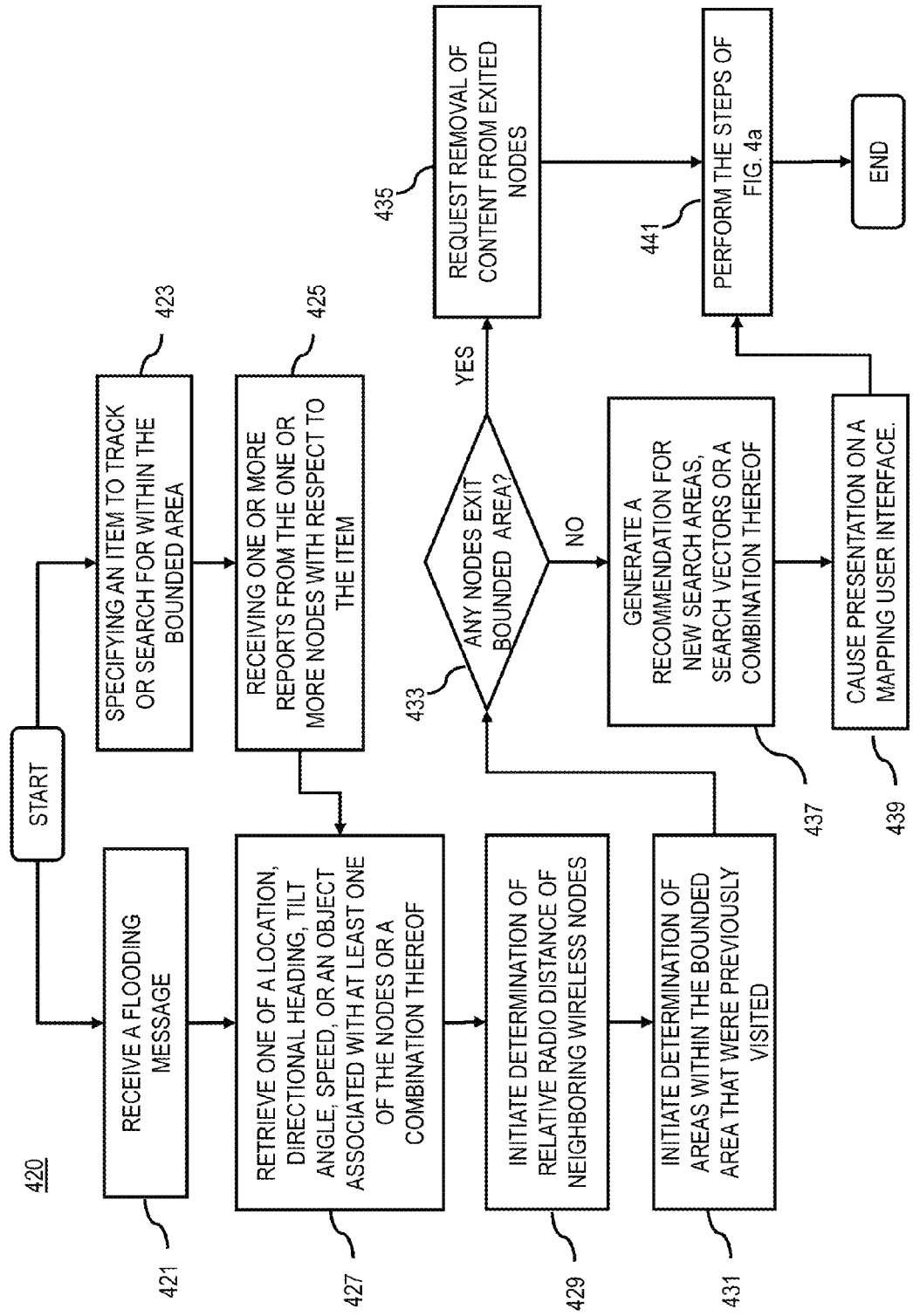

METHOD AND APPARATUS FOR AD-HOC PEER-TO-PEER AUGMENTED REALITY ENVIRONMENT

RELATED APPLICATION

This application is a continuation of U.S. patent application Ser. No. 12/732,802, now U.S. Pat. No. 9,417,691, filed Mar. 26, 2010, entitled "METHOD AND APPARATUS FOR AD-HOC PEER-TO-PEER AUGMENTED REALITY ENVIRONMENT", which is incorporated herein by reference in its entirety.

BACKGROUND

Service providers (e.g., wireless, cellular, etc.) and device manufacturers are continually challenged to deliver value and convenience to consumers by, for example, providing compelling network services. In particular, these services can include location and navigation services on a device, including augmented reality applications and content. Augmented reality applications allow users to generate real-time representations of physical environments with virtual computer-generated imagery. More specifically, the view of reality is modified by a computer, where the imagery is in semantic context with the environment. Consider, for example, a scenario where a user is operating a cell phone with integrated video capture that is recording the user's current surroundings. An augmented reality client application operable on the cell phone can interact with the video capturing device, location detection systems and any other sensory mechanisms of the cell phone, to overlay various graphic elements atop the recorded image. The graphic elements can, for instance, convey useful contextual information to the user regarding the images being captured, such as the names of objects, addresses, news data, advertisements, other attractions within proximity to the image being captured, etc. However, the graphic elements and related information (e.g., videos, images, etc.) can often involve the transfer of high volumes of data between the cell phone or other device and a corresponding server on the network, thereby taxing the bandwidth and capacity of the corresponding server and/or communication network. Accordingly, service providers and device manufacturers face significant technical challenges to providing rich content to or information to augmented reality and similar applications while reducing the burden on the supporting communication network.

SOME EXAMPLE EMBODIMENTS

Therefore, there is a need for an approach to providing augmented reality client application content to be enabled for one or more nodes within a bounded area of a mesh network as an alternate to providing the content over a traditional communication network.

According to one embodiment, a method comprises specifying a bounded area of a mesh network. The method also comprises associating content with the bounded area. The method further comprises causing, at least in part, a peer-to-peer transmission of the content to one or more nodes within the bounded area over the mesh network.

According to another embodiment, an apparatus comprising at least one processor, and at least one memory including computer program code, the at least one memory and the computer program code configured to, with the at least one processor, cause, at least in part, the apparatus to perform at least the following: specify a bounded area of a mesh network; associate content with the bounded area; and cause, at least in part, a peer-to-peer transmission of the content to one or more nodes within the bounded area over the mesh network.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2F is a diagram of the data structure of a network layer message header used to implement an embodiment of the invention;

FIGS. 4A and 4B are flowcharts of processes for generating or responding to flooding messages and receiving flooding messages within a bounded area of a mesh network respectively as used to implement an embodiment of the invention;

DESCRIPTION OF SOME EMBODIMENTS

Examples of a method, apparatus, and computer program for providing augmented reality client application content to be enabled for one or more nodes within a bounded area of a mesh network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "content" refers to any information (e.g., images, videos, audio files, documents, etc.) and/or context about a local environment as well as the users and communication devices within the local environment. By way of example, this content can be used to support applications for creating social networks, determining presence, determining contexts associated with a device, advertising, searching for information, etc. Also, as used herein, "augmented reality" (AR) applications refer to any computer executable utilities, operable by user equipment, for augmenting elements of live direct or indirect views of a physical real-world environment with virtual computer-generated imagery. The augmentation is conventionally in real-time and in semantic context with environmental elements of the moment, such as virtual sports scores presented to a TV display during a match. AR applications may include, but are not limited to, those that add computer vision and object recognition to video or image data, content generators for retrieving content relevant to a perceived image or video feed, virtual element generators for enhancing interface based applications, other and other techniques for enabling a user's interaction with real world environments to become interactive and digitally usable.

Although various exemplary embodiments are described with respect to providing awareness information over an ad-hoc mesh network, it is contemplated that the approach described herein may be used within any type of communication system or network.

Figure 1A:
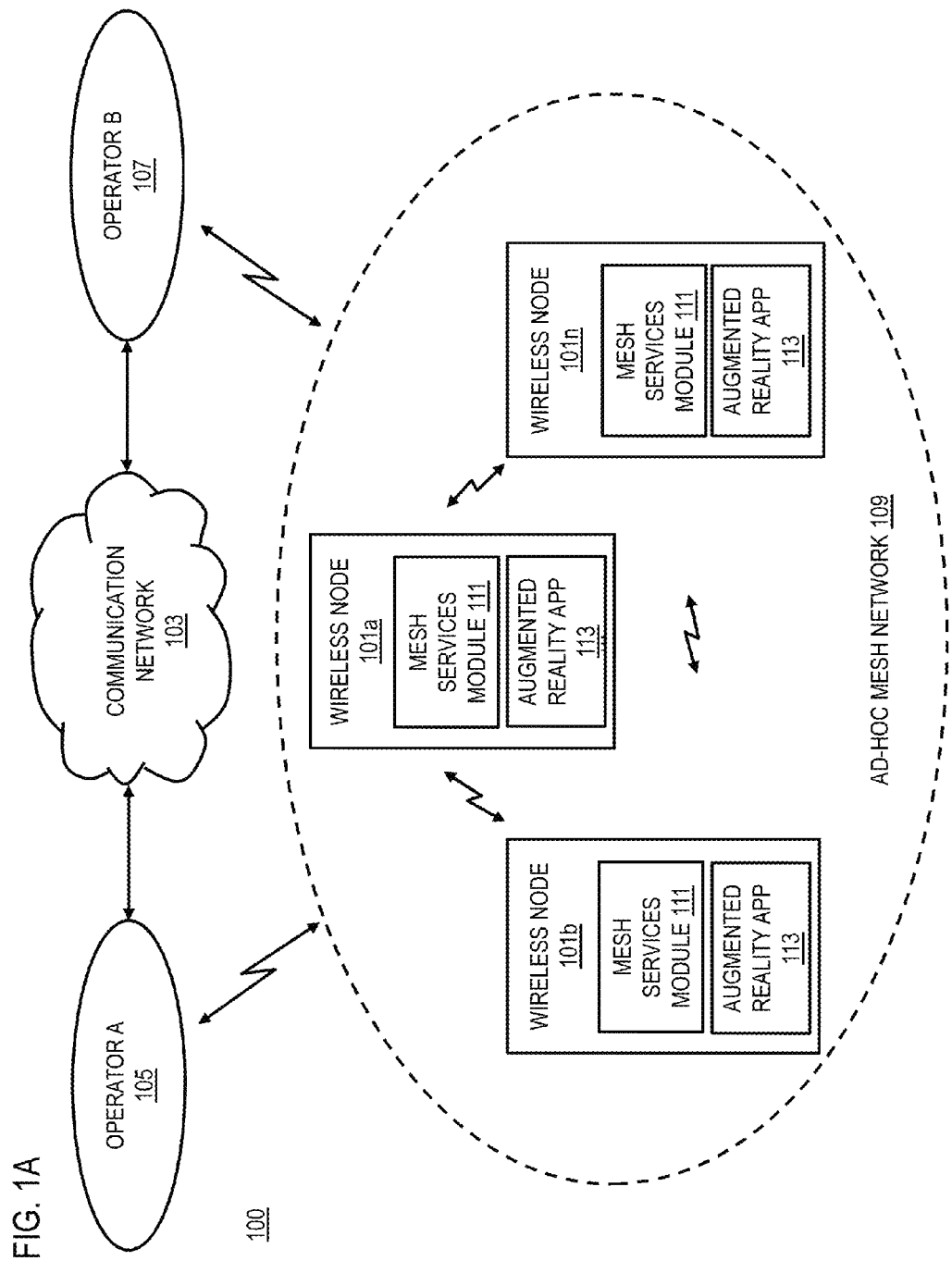
FIG. 1A is a diagram of a communication system capable of providing content within a bounded area of a mesh network used to implement an embodiment of the invention.

FIG. 1A is a diagram of a communication system capable of providing content within a bounded area of a mesh network, according to an exemplary embodiment. As noted previously, the use of services that provide for location-based or other contextually relevant information (e.g., augmented reality applications, location-based search engines, etc.) have greatly increased in popularity among consumers. Traditionally, the ability for augmented reality applications to convey useful contextual information relevant to the present moment is generally limited to the extent of access to a network (e.g., the Internet). Typically, a mobile augmented reality client application persistently communicates with a server to acquire useful content (e.g., points-of-interest, Wikipedia articles, retailer sponsored coupons, crowd sourced content, etc.) that it can display to the user relative to the perceived location and orientation. Depending on the size and type of data being retrieved as well as the demand for augmented reality content, network latency issues may arise, impeding the experience of real-time virtual elements relative to the user's present interaction within the environment. Furthermore, retrieval of data from over the internet for enabling augmented reality content can incur cost for the end user depending on the source of said data. Still further, explicit geo-search queries to an Internet service can expose the location, search history, etc. of the user and hence the likelihood of said user being tracked undesirably.

To address this problem, the system 100 of FIG. 1 introduces the capability to specify a bounded area of a mesh network (e.g., a bounded area corresponding to a point-of-interest or area within proximity of the point-of-interest), associate content (e.g., an image or video) with the bounded area, and then cause transmission of the content to one or more other devices or nodes within the bounded area over the mesh network. In this way, the system 100 need not communicate with a central server, thereby advantageously reducing or eliminating network traffic and resources for obtaining the content from the server. In one embodiment, from the perspective of the mesh network, the content has an association with the bounded area (e.g., the physical area delineated by the defined boundary) so that devices participating in the mesh network automatically transmit, receive, or otherwise exchange the content when the devices enter the bounded area. In certain embodiments, the devices may also automatically remove or be alerted to remove the content when leaving the area.

In another embodiment, the system 100 can present the content in one or more augmented reality applications or other location-based applications based, at least in part, on the relative locations, orientations, viewpoints, etc. of the nodes within the bounded area of the mesh network. In certain embodiments, the presentation of the content can be further based on the locations, orientations, viewpoints, etc. of objects or peripherals (e.g., pointers and other like objects) that are associated with the node or a user of the node.

As used herein, information and context comprise "content" of a mesh network that metaphorically equip a communication device with "radio eyes and ears" to continuously collect and exchange relevant information and content with other devices within a local or immediate environment of the mesh network. As noted above, content can refer to any data useful for facilitating an augmented reality application experience, including but not limited to video, audio, internet data, data files, object code, images, contextual and semantic data, textual data, etc. In one embodiment, content can be relevantly bound to a particular area (e.g., the bounded area) of the environment in which it is to be used, making certain content ideal for one area but obsolete for others. For example, content for conveying details regarding a local attraction with a particular city may be not be deemed relevant once the content generator or augmented reality application is outside of the city by say 50 miles. Hence, the usefulness of content is based in part at least on determined spatiotemporal (time-location-space based) data relevant to said content.

When taken in connection with augmented reality applications, participating communication devices, also referred to herein as "nodes," may interact in a manner that facilitates enhanced conveyance of content, supports peer-to-peer versus client/server computing techniques, enhances access to relevant content pertaining to a given environment in question with minimal network dependence, maintains the privacy and anonymity of users sharing content and prevents the proliferation of undesired messages (e.g., spam) over the network. Throughout the description herein, it should be noted that any reference to the conveyance, broadcasting, generation or sharing of content also applies to any information transmitted by the nodes over the mesh network.

As shown in FIG. 1A, a system 100 comprises one or more wireless nodes 101a-101n optionally having connectivity to a communication network 103 through either operator A 105 or operator B 107. The wireless nodes 101a-101n are any type of mobile terminal, portable terminal, or fixed terminal including mobile handsets, personal computers, stations, units, devices, multimedia tablets, Internet nodes, communicators, Personal Digital Assistants (PDAs), radio readable tags (e.g., near field communication (NFC) tags, radio frequency identification (RFID) tags), or any combination thereof. It is also contemplated that the wireless nodes 101a-101n can support any type of interface to the user (such as "wearable" circuitry, etc.).

In exemplary embodiments, the wireless nodes 101a-101n form an ad-hoc mesh network 109 for sharing content and other information. The ad-hoc mesh network 109 is, for instance, a connectionless and server-less device-to-device network (e.g., a mobile ad-hoc network (MANET)) created using short-range radio technology (e.g., wireless local area network (WLAN) or Bluetooth®). Within the ad-hoc mesh network 109, each wireless node 101 may be mobile and is within communication range of any number of other wireless nodes 101. Accordingly, the set of wireless nodes 101a-101n that is within communication range—i.e., within the bounds of the mesh network 109 of any particular wireless node 101—is transient and can change as the wireless nodes 101a-101n move from location to location.

In particular, the system 100 creates the ad-hoc mesh network 109 for sharing content in a connectionless fashion. As used herein, the term "connectionless" refers to the ability of a node (e.g. wireless node 101a) to send and of all surrounding nodes 101a-101n to receive information without the need to send any prior control signaling. For example, sending information or content using the transmission control protocol/IP (TCP/IP) over a WLAN ad-hoc is not connectionless because of the two-way TCP control signaling between the sending and receiving nodes used to establish the TCP connection. The content is provided or shared over the mesh network 109, for instance, in small anonymous messages that are exchanged by the wireless nodes 101a-101n automatically without user intervention. As used herein, the term "anonymous" means that it is not possible to infer the true identity of the sender from the message, unless the true identity is intentionally included in the message (e.g., by the user or another entity authorized by the user). The exchange of information or content occurs as, for instance, a broadcast message (i.e., a flooding message) from a wireless node 101 to neighboring wireless nodes 101 that are within range of the radio of the broadcasting wireless node 101. As neighboring wireless nodes 101 receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc. (e.g., defined according to one or more predetermined bounded areas of the mesh network 109).

The wireless nodes 101a-101n may access and share content with one another readily via the mesh network 109, accessing the generated content from internal cache or storage of the participating nodes within the network 109. In an alternative implementation, the nodes can share content via IP through the communication network 103 depending, for instance, on the availability of other nodes 101a-101n in the mesh network 109, network traffic in the mesh network 109, network traffic in the communication network 103, the anticipated volume of data, and the like. In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a wireless node 101 appearing/disappearing to/from the network does not generate any control signaling in the ad-hoc mesh network 109.

Similarly, the system 100 creates routing information only when needed to route replies to queries back to the querying node. The routing information is generated by using the query messages alone (i.e. no control signaling is used for creating routing information). After the query and subsequent reply process is completed, the routes are forgotten. In other words, the query/reply process of system 100 provisions routes for a reply to provide awareness information on demand rather than pushing awareness information from one node 101 to another. In exemplary embodiments, both push (e.g., information is published over the ad-hoc mesh network 109) and pull (e.g., information is queried from other nodes 101a-101n of the ad-hoc mesh network 109) modes of disseminating content or information are possible. In certain embodiments, it is contemplated that the pull mode of operation can be used instead of the push mode to help suppress potential spam messages.

Figure 1B:
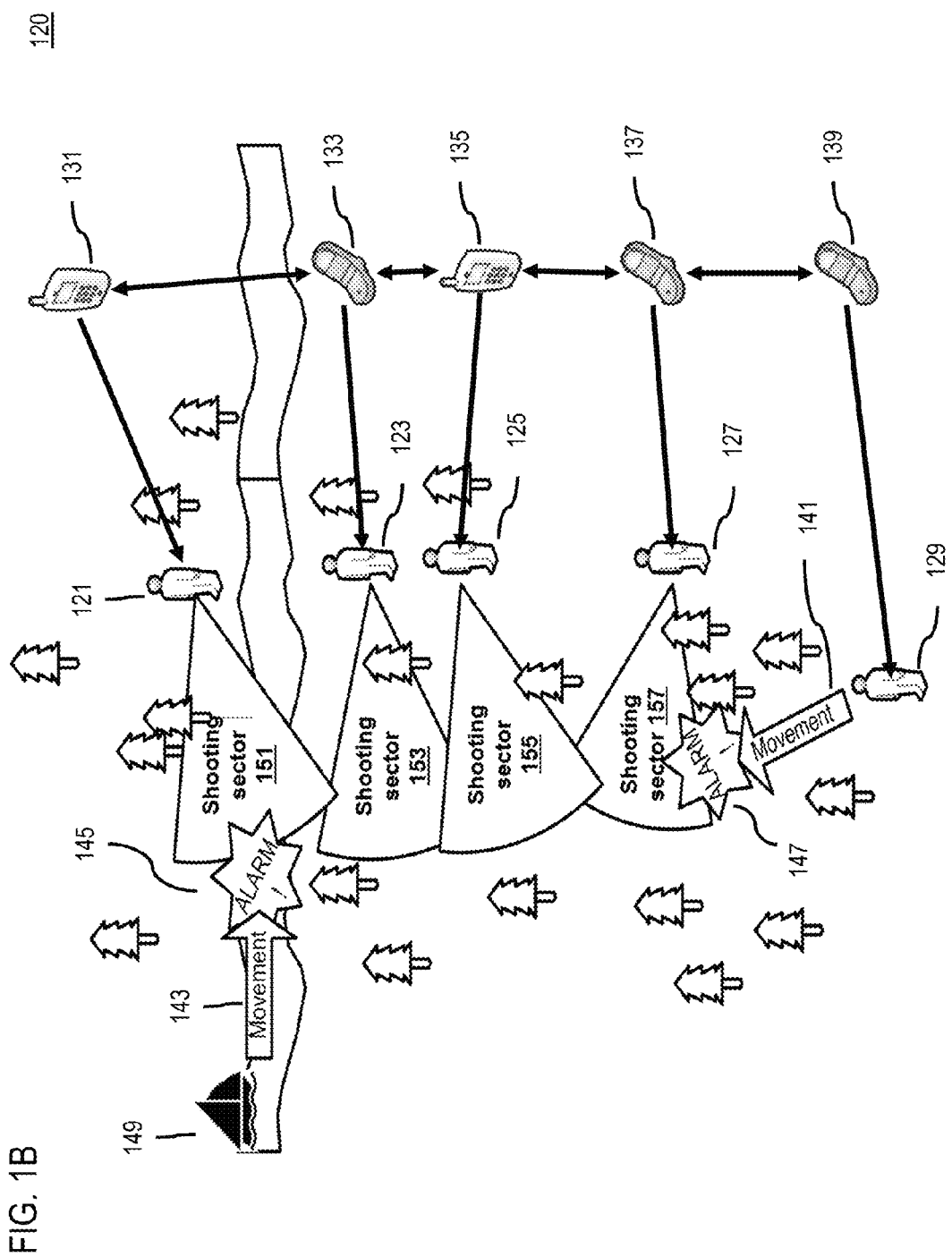
FIG. 1B is a diagram of nodes interacting within a common environment within a bounded area of a mesh network as used to implement an embodiment of the invention.

The system 100 also enables the development of new services and applications based on shared content (e.g., social networking applications, location-based applications, application for determining presence, applications for determining context, advertising applications). In particular, the continuous and immediate nature of the awareness information with respect to local environment enables compelling new augmented reality applications. For instance, content and other information can be exchanged between multiple nodes to enable shared augmented reality application interplay between nodes within a hunting environment. FIG. 1B is a diagram of nodes interacting within a common environment within a bounded area of a mesh network as used to implement an embodiment of the invention Within a hunting environment 120, multiple users 121-129 (e.g., hunters) equipped with portable user equipment, i.e., cell phones or smartphones 131-139 respectively, interact to share awareness information and content within the context of the common environment 120. In this example, the extent of the hunting environment 120 represents the particular bounded area of a mesh network created among the smartphones 131-139 of the participating hunters. Hence, as shown, each phone is capable of communicating with the other over an ad-hoc mesh network 109 employing, for instance, a short range radio connection (e.g., WLAN, Bluetooth®, and the like). Also, as shown with respect to FIG. 1, each phone 131-139 has resident thereon an augmented reality client application 113 for generating AR related views respective to shared information or content. So, as an example application or use case, each hunter 121-129 can share shooting sector information 151-157 with the other 151, graphically represented to each user's device as an overlay upon an aerial view or map of the forest in question—i.e., mesh based hunting. This application would allow users to see in real time on the shared map where other hunter's areas and shooting sectors are. In addition, the current position, directional heading, gun tilt angle, speed of movement of the hunter, detected ammunition discharge (e.g., detected via audio detection and analysis) and other data can be shared for conveyance by a respective AR client application operable via a given device's graphical user interface.

Within the same context, as another application or use case, alterations in movement can be persistently reported to each node 131-139, so as to enable alerts to be generated when unwanted objects are within or encroach upon a given shooting sector 151-157. Consider, for example, a first hunter 129 whose detected movement 141 is on due course for and in the direction of a second hunter's 127 shooting sector 157. Consider also a moving boat 149, whose movement 143 is on due course for and in the direction of a third hunter's 121 shooting sector 151. In addition to updating this perceived movement through persistent exchange of awareness information between nodes 131-139 within the ad-hoc network, content such as images reflecting the path of travel of each hunter 121-129 can be used to update what is displayed to each user's 121-129 application interfaces. An alarm 145 and/or 147 can be triggered by the augmented reality application 113 on the phone of each participating hunter, the hunter's 121 and 127 whose shooting sectors 151 and 157 are to be encroached, or the device of the potential encroacher 129.

Furthermore, the augmented reality application 113 can be further integrated with the firearm, such as to enable its disablement in response to a detected alarm. Ideally, all firearms are equipped with direction and angle sensors, and that information is generated into and presented as useful content on a map of the hunting environment 120. The sensor can be connected with the mobile device, i.e., with the Bluetooth, and the devices 131-139 can form the mesh network. The application could also warn if the shooting line is too low in shot guns, to prevent any possibility for danger. The application could also warn if the gun points outside of the agreed shooting sector 151-157, and activate an especially loud alarm if some other shooter is in the direction of the gun. A sensor can also be integrated with the safety switch, enabling activating an even louder alarm if the safety switch is off. Still further, the augmented reality application 113 could further suggest and display an alternative route to the encroaching hunter 129 based, at least in part, on the shared awareness information between nodes 131-139.

Integrated sensory devices such as audio recorders, video recorders, spatiotemporal detection devices, movement detection mechanisms, etc. are readily combined with the increasingly available storage and computing power in mobile devices (e.g., wireless nodes 101a-101n). As such, the sensor devices are able to provide additional contextual, spatial and other practical data regarding each user within the ad-hoc network as engaged in the bounded environment 120. Said data is useful for generating content in connection with the augmented reality applications 113 operable upon each device. Furthermore, the compilation of such data creates for the user a local semantic web, whereby local awareness information and content are created and searched for automatically by wireless nodes 101 within the ad-hoc mesh network 109. As used herein, the term "semantic web" refers to a system in which the information and messages shared with the system is understandable by the nodes 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, presenting information or content in, searching for friends within a defined community, finding out what is going on and what kind of people are around a user, making the environment aware of the user, and other like applications that can be further enhanced with real-time virtual reality elements.

The following are further exemplary use-case scenarios for applications based on awareness information (including content) in connection with augmented reality applications.

Bird watching applications could form automatically via a mesh network between members of the same bird watching club or group. While the club members are in nature looking for a rare bird, all members could see the locations of all other searchers on a shared map. Each user's display could be augmented with useful content detailing the type of bird currently being displayed by another participant, audio data replicating bird sounds generated, or current flight pattern information. If somebody sees the rare bird, the bird watcher could press a button and indicate immediately to all others that he/she sees the bird. Sensors within the mobile device could detect the direction of viewing (or moving direction) or direction could be pointed with the mobile device, or filming/photographing the bird could automatically indicate the direction. This direction would be transmitted to others automatically.

As yet another application or use case, tourism can be enhanced via the concepts and techniques herein as utilized by a group of tourist. For example, one tourist equipped with a requisite cell phone can press a button to bring others attention to something (push to talk, take pictures, your orientation or pointing to a direction, your posture) with or without a shared map. This would be done via the standalone ad-hoc mesh network. This would avoid high roaming charges (flat rate is typically not available when roaming). Furthermore, the awareness information exchanged in this context could be used in connection with augmented reality applications, so at to render each tourist's user interface with useful interactive elements against the map (e.g., video, sound recordings, news feeds) based at least in part of the relative position, placement, orientation or context of the receiving tourist.

In yet another application or use case, search and/or rescue operations are facilitated by rescuers distributed over a mesh network. Awareness information and content can be exchanged between rescuers, including vital stat information as detected, visual route (e.g., like virtual graffiti) indicators against a map for enabling quick route execution, etc. More specifically, mobile devices associated with the respective searchers or rescuers may be organized over the mesh network to share common mapping information and to choose optimal routes to maximize the likelihood of finding a lost item or person. By way of example, the map may present which areas have already been covered and which areas still need to be searched. In addition, information such as the location and heading of the searchers can be combined with information about the search area to recommend where and how each search should go next. Other aspects of the search and rescue use case is described in more detail with respect to FIG. 4B below.

Figure 2A:
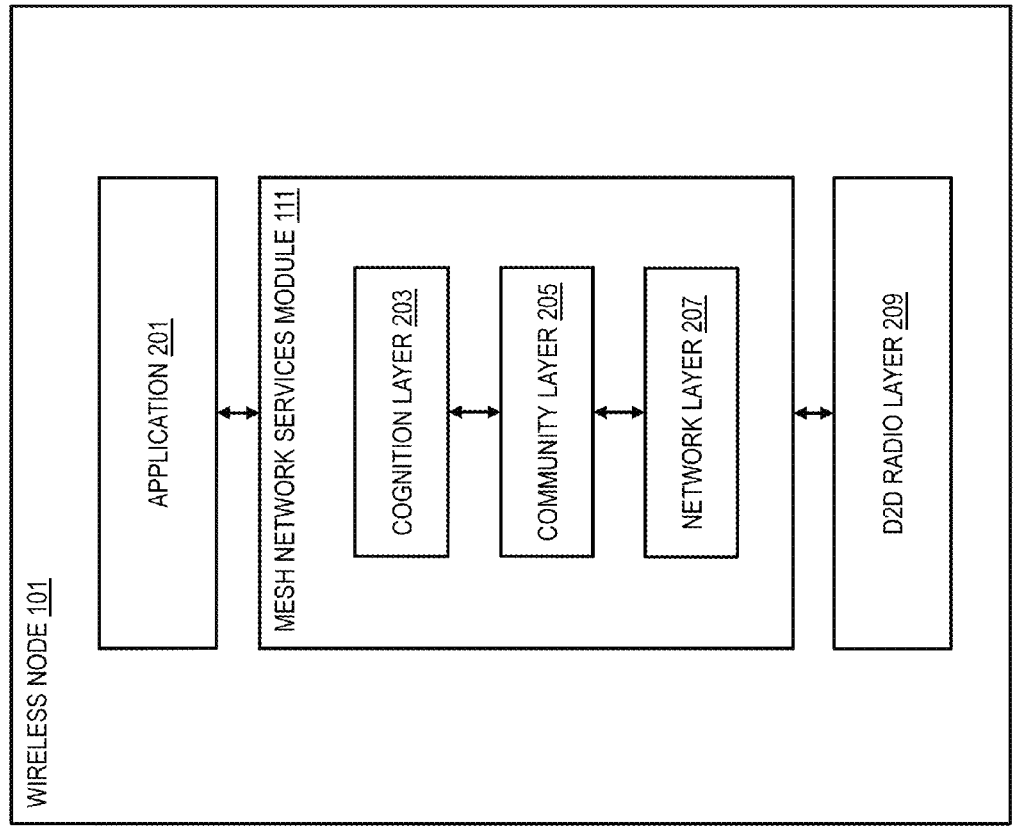
FIG. 2A is a diagram of the components of a wireless node including an mesh network services module used to implement an embodiment of the invention.

FIG. 2A is a diagram of the components of a wireless node including a mesh network services module, according to an exemplary embodiment. FIG. 2A is described with respect to FIGS. 2B-2E which are diagrams of the components of a mesh network services module 111, according to various exemplary embodiments. As shown in FIG. 2A, a wireless node 101 includes one or more components for sharing content or information within the ad-hoc mesh network 109. It is contemplated that the functions of these components may be combined in one or more components or performed by other components of equivalent functionality. In this embodiment, the wireless node 101 includes an application 201 that uses content available in the ad-hoc mesh network 109 to provide various services and functions including social networking, location-based services, presence information, context determination, advertising functions, etc. The application 201 may interact with the mesh network services module 111 to obtain or share content. Furthermore, the application may serve as an augmented reality (AR) application, wherein it acquires, detects or otherwise generates content useful for facilitating AR in connection perceived or retrieve contextual information (e.g., location, orientation, viewpoint, tilt angle, directional heading, speed, etc.) of other nodes 101a-101n.

Figure 2B:
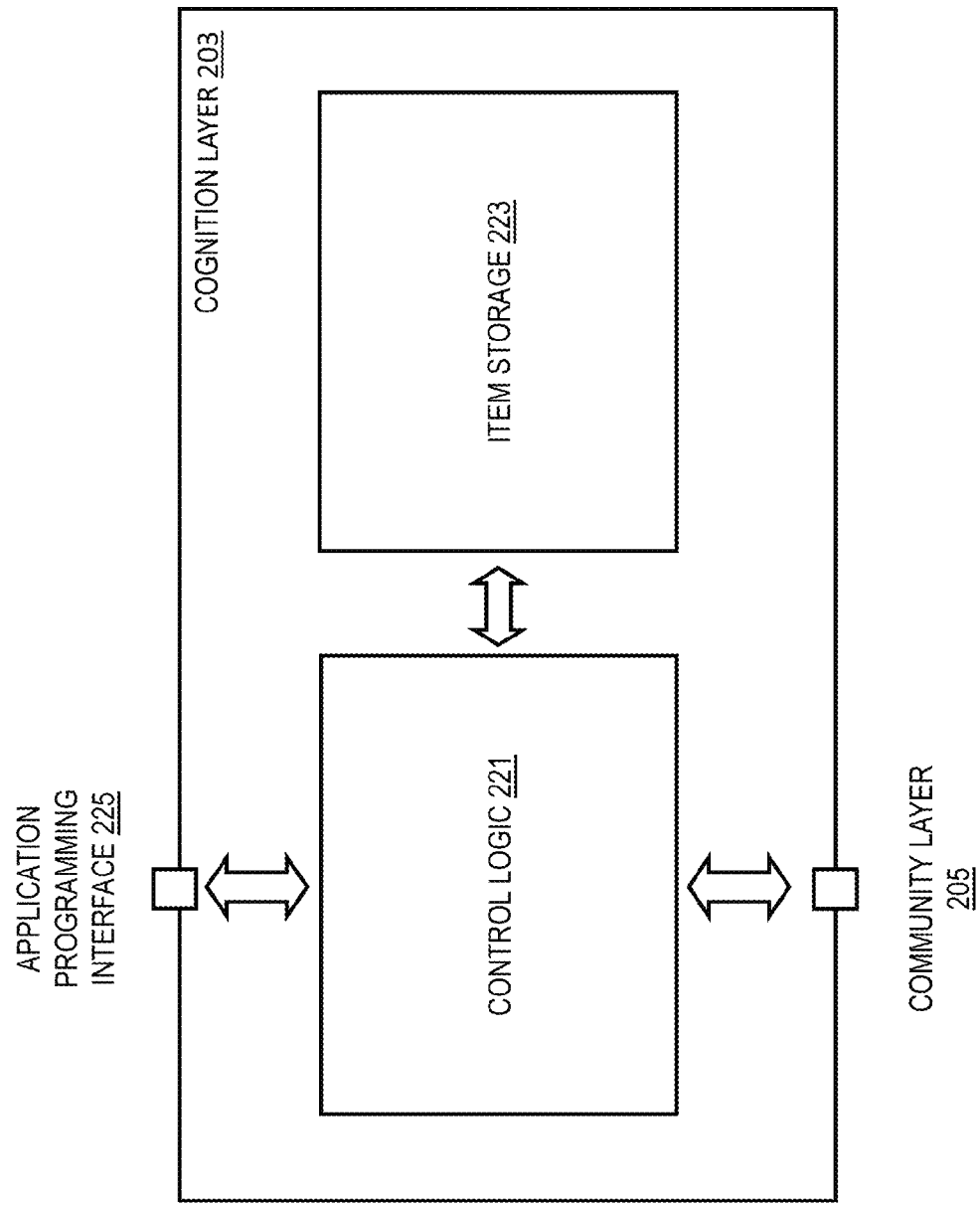
FIGS. 2B-2E are diagrams of the components of an mesh network services module used to implement an embodiment of the invention.

By way of example, the mesh network services module 111 includes three layers: a cognition layer 203, a community layer 205, and a network layer 207. The cognition layer 203 is the highest control layer for sharing content or information. As shown in FIG. 2B, the cognition layer 203 includes a control logic 221 and item storage 223. The control logic 221, for instance, provides the logic for creating, publishing, querying, and receiving content or information over the ad-hoc mesh network 109. The control logic 221 can store the information that it either creates or receives in the item storage 223. It is contemplated that the item storage 223 may be of sufficient size to store all or a portion of the information or content that flows through the wireless node 101 over a configurable period of time (e.g., days, months, or years).

In exemplary embodiments, the control logic 221 enables querying and dissemination of content or information by initiating, for instance, the flooding of the query or information to neighboring wireless nodes 101 within the ad-hoc mesh network 109. For example, upon receiving a query, the wireless nodes 101 in the local neighborhood that have the queried information reply to the querying node automatically. In exemplary embodiments, the reply information can be the content associated with a bounded area of the ad-hoc mesh network 109 and is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens of bytes of information). In other instances, however, a pointer to the content minimizes the data traffic that flows through the ad-hoc mesh network 109. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 of the wireless node 101.

In other exemplary embodiments, content or information can also be published directly by flooding an awareness message. Such a push mode for the dissemination of awareness information can be used to support some applications (e.g. advertising or group chatting) over the ad-hoc mesh network 109.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.).

The control logic 221 may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc mesh network 109 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of content or information within a bounded area of the ad-hoc mesh network 109, it is recognized that undesired or unsolicited messages (e.g., spam messages) may become a problem. To address this problem, the control logic 221 may obtain, for instance, information from the lower system layers of the mesh network services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The cognition layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing content or information over the ad-hoc mesh network 109. It is contemplated that the API 225 is extensible to accommodate any application designed to access or use content associated with a bounded area of an ad-hoc mesh network 109. The applications in the various nodes 101 do not have to be the same or mutually compatible. It is sufficient that the applications use the API correctly to be able to publish and search content or information in the surrounding nodes 101.

The cognition layer 203 also has connectivity to the community layer 205. The community layer 205 controls the formation and cataloging of communities of wireless nodes 101 within the ad-hoc mesh network 109. By way of example, a user may create any number of communities for sharing content or information. It is contemplated that a community may be either a peer community (e.g., any wireless node 101 may join), a personal community (e.g., a wireless node 101 may join only if invited), or the open local community that consists of all nodes in the local neighborhood. In exemplary embodiments, the messages that traverse between the wireless nodes 101 within the ad-hoc mesh network 109 belong to one of these three community types. Communities can either be private (messages are encrypted) or public (no encryption used). In exemplary embodiments, membership and status in a community affect how the wireless node 101 shares awareness information (see the discussion with respect to FIG. 2G for additional details of community membership).

Figure 2C:
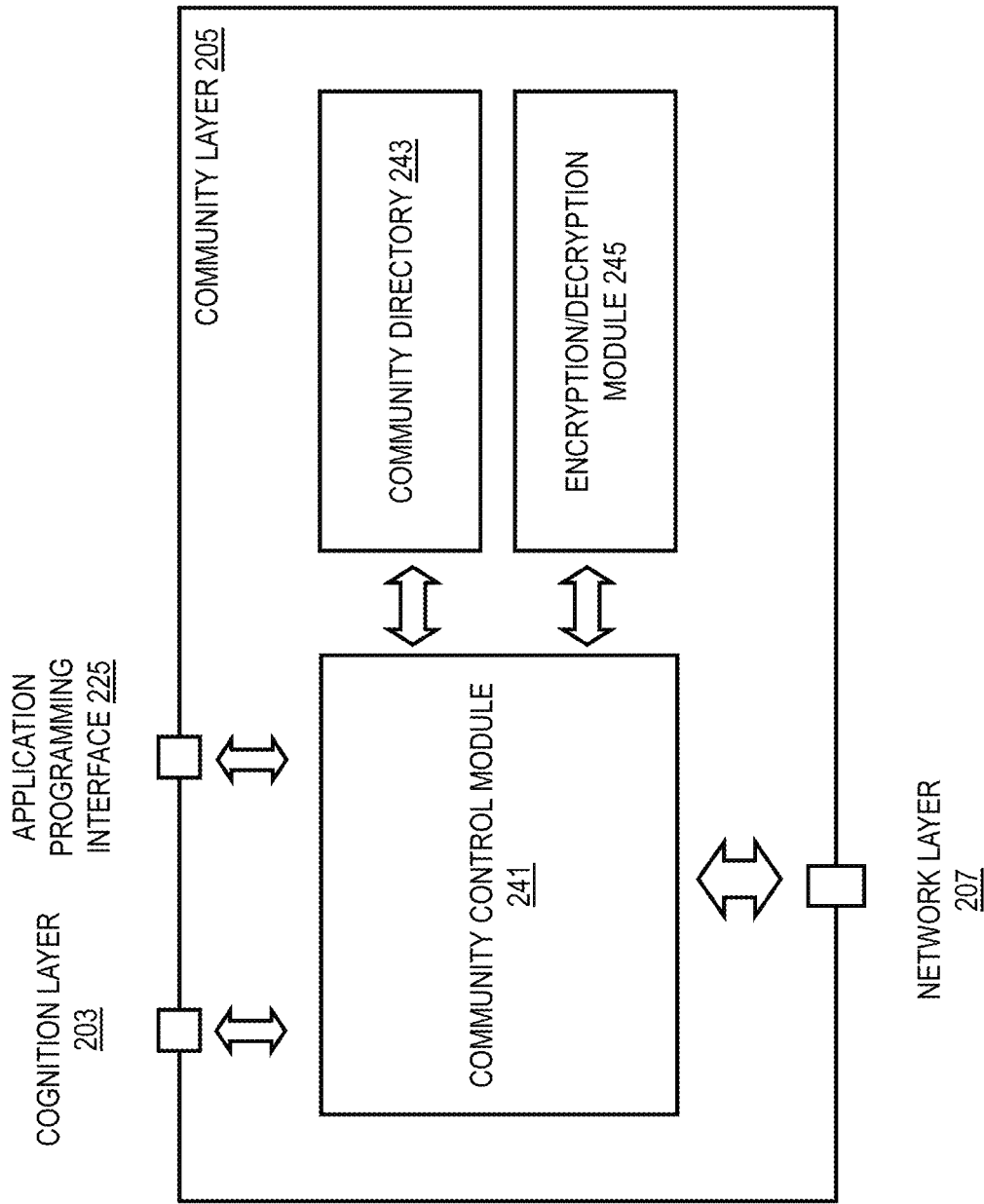

Furthermore, a community may be created for any purpose or duration (e.g., a permanent work community, a permanent community of friends, a temporary community of concert goers lasting only the duration of the concert). In one embodiment, the community may defined by location to automatically include one or more of the wireless nodes 101 operating within a predefined bounded area of the ad-hoc mesh network 109. As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In exemplary embodiments, the community control module 241 assigns a unique community identification number (CID) to each community for use within the ad-hoc mesh network 109. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts with an encryption/decryption module 245 to anonymize the CID when including the CID in messages or content over the ad-hoc mesh network 109. For example, a wireless node 101 may direct a query to a specific community using an anonymized CID (e.g., a pseudonym) associated with the community in lieu of the actual CID. In exemplary embodiments, multiple anonymized CDs may be used to represent a single community. In this way, it is more difficult to identify queries corresponding to a particular community by monitoring traffic within the ad-hoc mesh network 109. From the perspective of an outside observer, the anonymized CDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the cognition layer 203. The special header, for instance, contains a list of anonymized community identifiers corresponding to the communities to which the message is relevant.

Figure 2D:
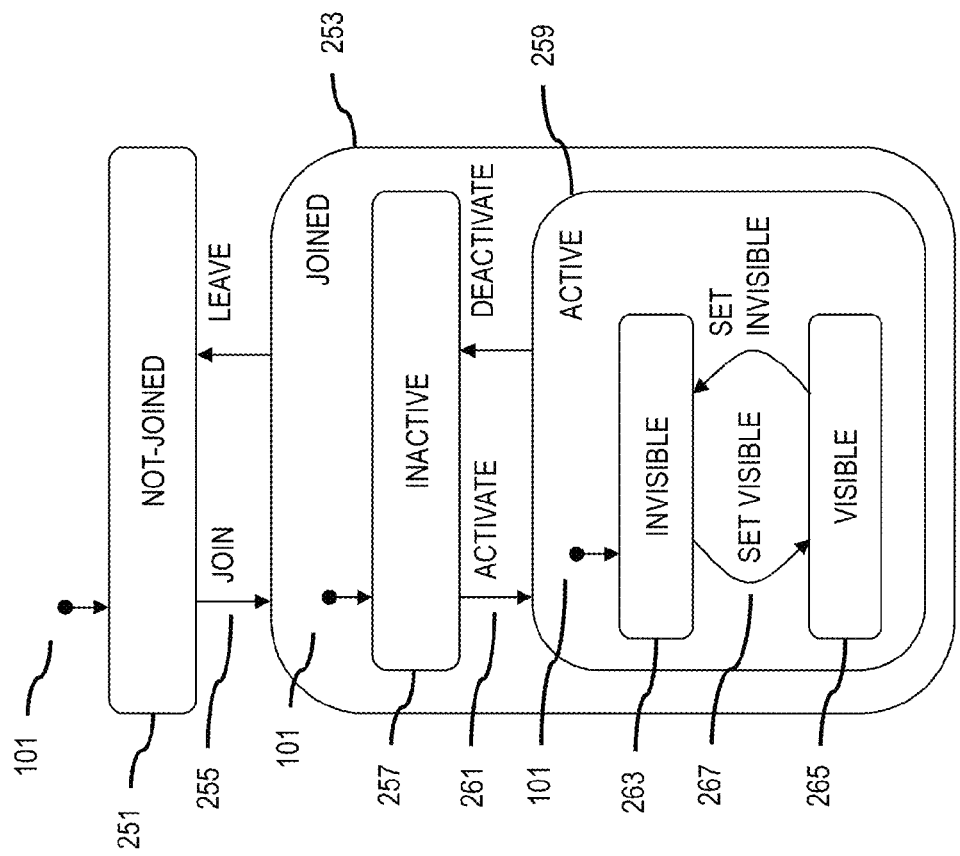

FIG. 2D is a state diagram of the effect of community membership and status on sharing content within a bounded area of a mesh network, according to an exemplary embodiment. As shown in FIG. 2D, a wireless node 101 may be in either one or two states (e.g., a not-joined state 251 and a joined state 253) with respect to membership in a community within the ad-hoc mesh network 109. The application 201 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages or content directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the wireless node 101 is in the joined state 253, the wireless node 101 may also be in either an inactive state 257 or an active state 259. To transition between the inactive state 257 and the active state 259, the application 201 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community. When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the cognition layer 203. The header contains, for instance, a list of anonymized community identifiers identifying the communities to which the message is relevant.

It is contemplated that a special personal community can be reserved for tracking new bonds or relationships created between users within, for instance, the bounded area of the ad-hoc mesh network 109. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community. Once the credentials are exchanged and the bond has been created, user A may find user B over the ad-hoc mesh network 109 by searching for members of user A's "new bonds" community. In other words, with a simple search of a single community, user A can search for all the people in user A's local neighborhood with whom she has created a bond. This requires that a high number of community CIDs and Ks can be stored in the community directory 243. Also, an effective lookup of the community directory must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community.

Figure 2E:
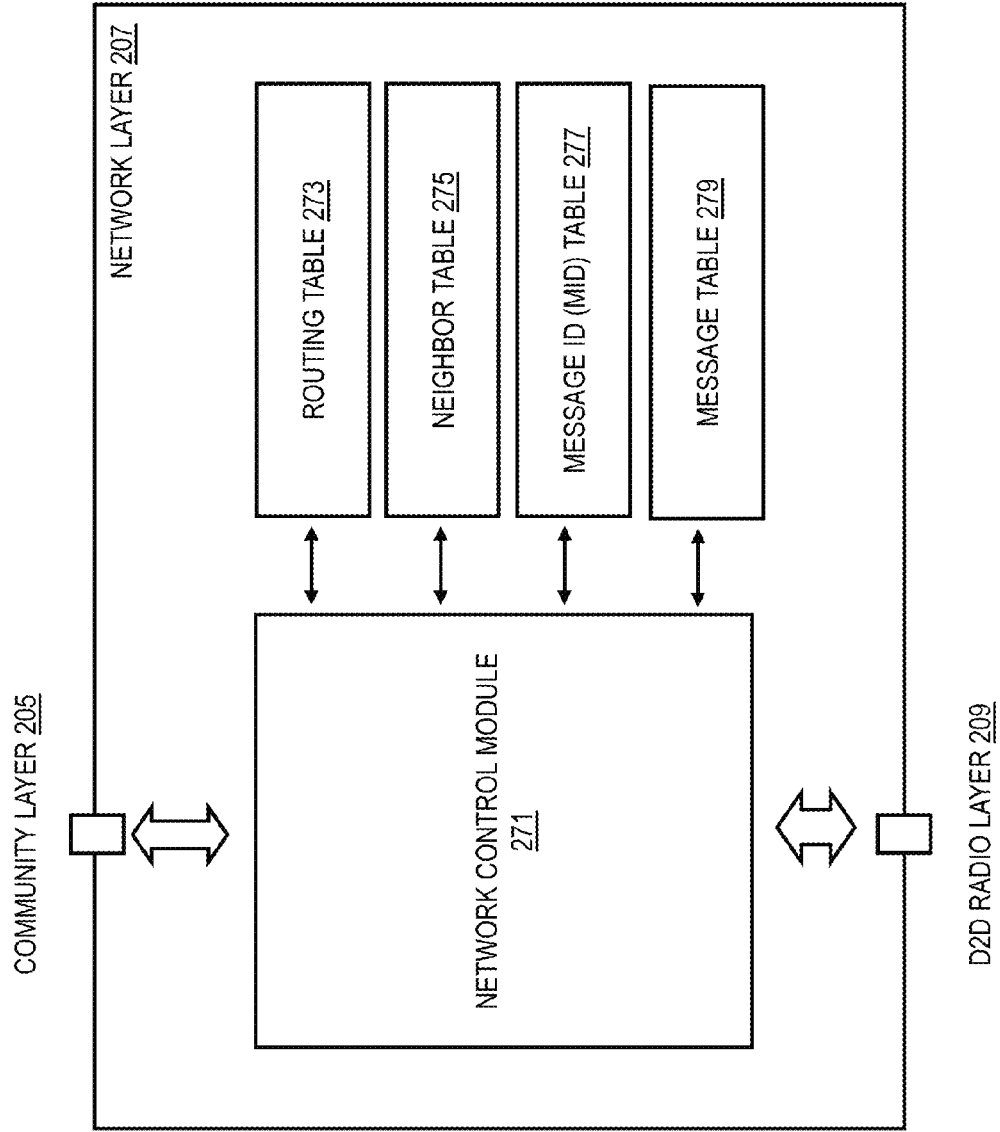

As shown in FIG. 2C, the community layer 205 has connectivity to the cognition layer 203 above and the network layer 207 below. The network layer 207 manages the rebroadcasting of received flooding messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc mesh network 109.

In exemplary embodiments, the network layer 207 may insert a header into messages it receives from the community layer 205 to, for instance, direct flooding and routing of the received messages and content. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum flooding radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network 109, each subsequent wireless node 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with wireless nodes 101 that have rebroadcasted a message and the MSN of the message.

TABLE 1

| Destination NID | Transmitter NIDs | Message Sequence Number |
|---|---|---|
| $DST_1$ | $TX_{11}, TX_{12}, \ldots, TX_{1M}$ | $MSN_1$ |
| $DST_2$ | $TX_{21}, TX_{22}, \ldots, TX_{2N}$ | $MSN_2$ |
| $\ldots$ | $\ldots$ | |
| $DST_S$ | $TX_{S1}, TX_S, \ldots, TX_{ST}$ | $MSN_S$ |

The neighbor table 275 contains a list of the neighboring wireless nodes 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network 109. For example, the system 100 can reduce the potential for overloading the ad-hoc mesh network 109 by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network 109. For example, unintended synchronization of the message broadcasts may result in too many nodes 101 sending broadcasting (i.e., flooding) messages over the ad-hoc mesh network 109 at exactly the same time. Additionally, the delay time provides an opportunity for the network control module 271 to monitor and count rebroadcasts of the message by other neighboring wireless nodes 101.

TABLE 2

| Transmitter NID | Relative Radio Distance |
|---|---|
| $TX_1$ | $D_1$ |
| $TX_2$ | $D_2$ |
| ... | ... |
| $TX_T$ | $D_T$ |

The MID table 277 contains a list of received messages. As the wireless node 101 receives messages from neighboring nodes over the ad-hoc mesh network 109, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network 109. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
|---|---|---|
| $(SRC_1, MSN_{11})$ | "SENT" | $t_{11}$ |
| $(SRC_1, MSN_{12})$ | "NOT SENT" | $t_{12}$ |
| ... | ... | ... |
| $(SRC_2, MSN_{21})$ | "NOT SENT" | $t_{21}$ |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not relayed over the ad-hoc mesh network 109 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring wireless nodes 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network 109.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D radio layer 209 below) but not by the mesh network services module 111. However, under certain circumstances, the D2D radio layer 209 can provide such messages to the mesh network services module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---------|--------------|--------------------|
| $MSG_1$ | $t_1$ | $C_1$ |
| $MSG_2$ | $t_2$ | $C_2$ |
| ... | ... | ... |
| $MSG_M$ | $t_M$ | $C_M$ |

As shown in FIG. 2A, the mesh network services module 111 has connectivity to a device-to-device (D2D) radio layer 209. The D2D radio layer 209 enables the formation of the ad-hoc mesh network 109 and sharing of awareness information using, for instance, short range radio technologies such WLAN and Bluetooth®. It is contemplated that the D2D radio layer 209 may use any wireless technology for communication between devices over short ranges. The radio technology, for instance, enables each wireless node 101 within the ad-hoc mesh network 109 to broadcast messages in a connectionless way to the neighboring nodes 101 that are within radio range. As used herein, the term "connectionless" means the wireless nodes 101 need not use two-way signaling to establish a communication channel before broadcasting a message. In exemplary embodiments, the D2D radio layer 209 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

Figure 3:
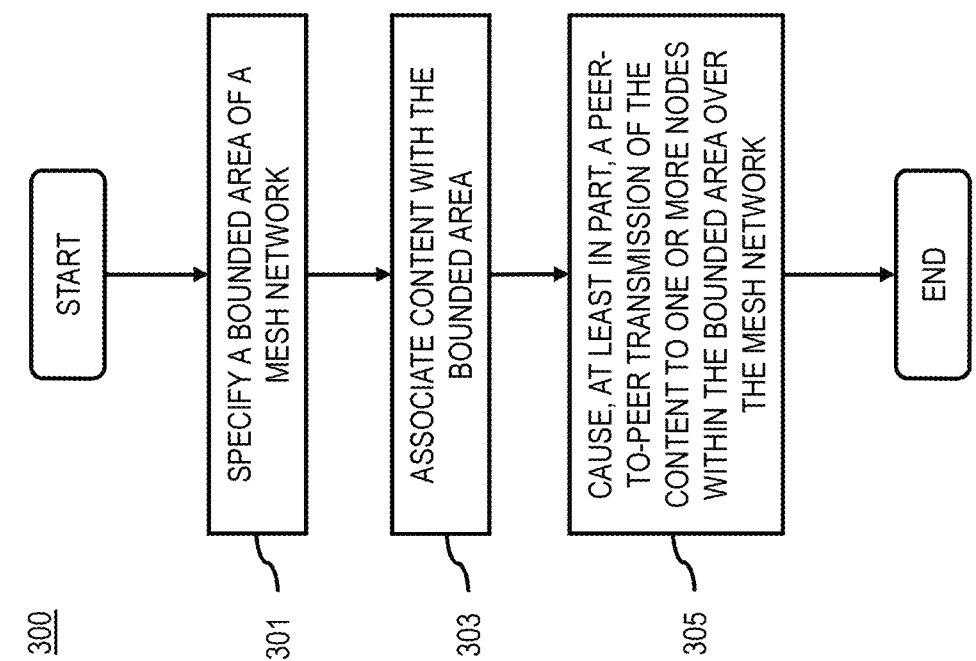
FIG. 3 is a high-level flowchart of the process for transmitting content to one or more nodes with a bounded area of a mesh network as used to implement an embodiment of the invention.

Reference is now made to FIG. 3, a high-level flowchart of the process 300 for transmitting content to one or more nodes within a bounded area of a mesh network as used to implement an embodiment of the invention. In general, a bounded area of the mesh network is specified (step 301), such as by at least one of the one or more nodes within the mesh network. As noted, this bounded area can be specified based, for instance, on a point-of-interest or other location with which the user would like associate content. For example, the bounded area may be specified by identifying the point-of-interest and a corresponding radius or area surrounding the point of interest. In addition or alternatively, the bounded area may be specifying by outlining a specific area on a mapping display or other representation of the area of interest. Next, content is associated with the specified bounded area (step 303). As mentioned before, the content can be generated by an augmented reality application of a given node or by any other application whose content the user wants to associated with the bounded area. Finally, peer-to-peer transmission of the content is executed respective to one or more nodes within the bounded area over the mesh network (step 305). Transmission is triggered by at least one node within the network, such as manually or based on detected events or location information (e.g., including orientation, directional heading, tilt angle, viewpoint, etc.).

Figure 4A:
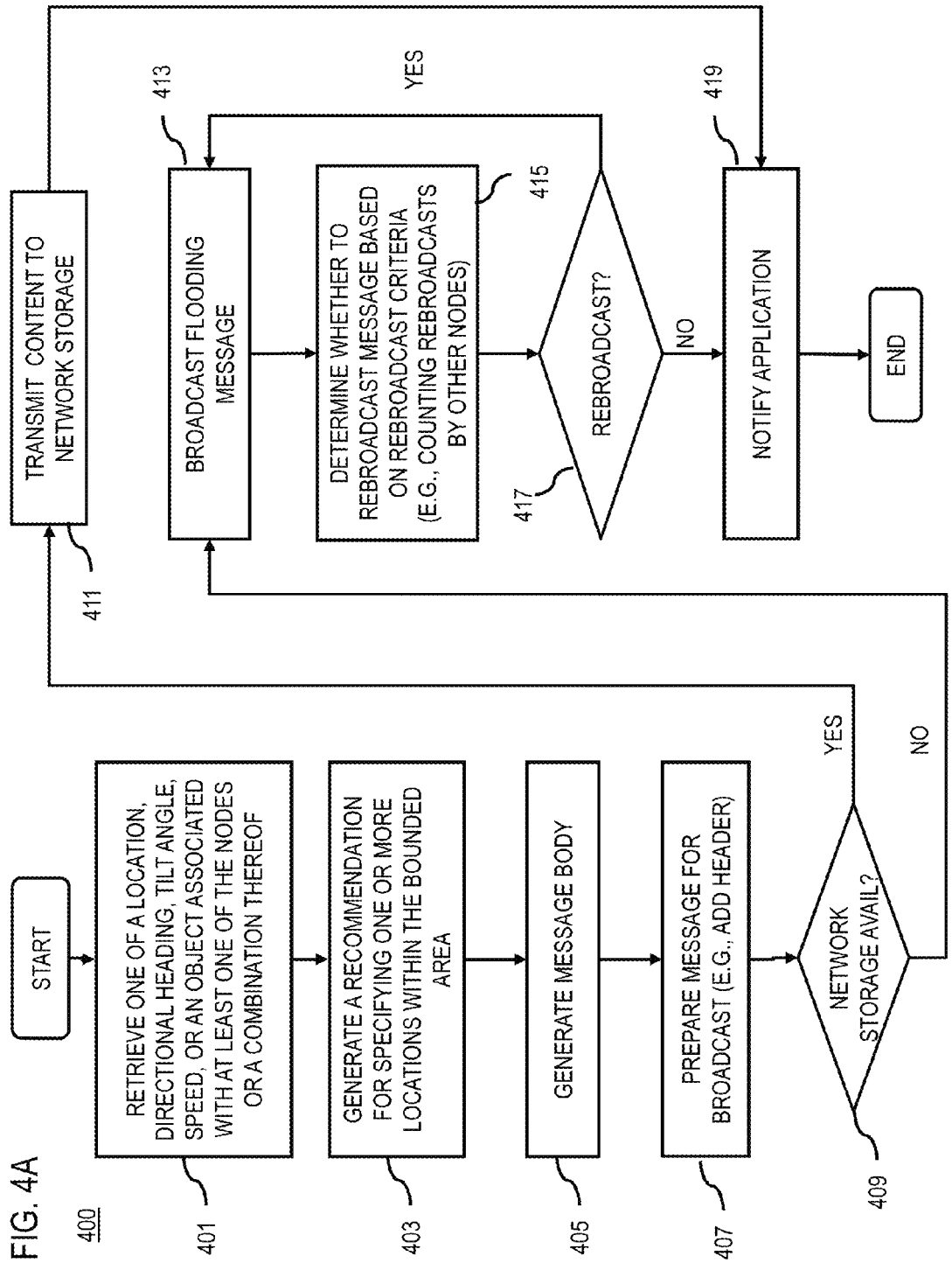

FIGS. 4A and 4B are flowcharts of processes for generating or responding to flooding messages and receiving flooding messages within a bounded area of a mesh network respectively as used to implement an embodiment of the invention. The steps conveyed are performed by one or more of a combination of nodes 101, each node 101 having operable thereon a mesh network services module 111 and an augmented reality application 113. It will be understood that the steps as presented are executed resulting from the integrated and cooperative interaction of these applications for each node 101.

Beginning with the process 400 of FIG. 4A, a first step comprises at least one of the nodes 101 retrieving contextual information regarding at least one of the nodes 101 within the mesh network 109. The retrieved information can include, but is not limited to, location information, directional heading data, tilt angle info, speed, an object or object type associated with at least one of the one or more nodes 101, or a combination thereof (step 401). The retrieved information can also be that pertaining to the node 101 that invoked this process.

Next, the node 101 generates a recommendation for specifying one or more locations with the bounded area based, at least in part, on the location, the directional heading, the tilt angle, the speed, or a combination thereof (step 403). The content generated ultimately for enabling or enhancing the augmented reality experience can include the recommendation. Recommendations, as used herein, pertain to any information the informs a user within the ad-hoc mesh network of any necessary adjustments, alternatives or proposals that should be considered by a corresponding node within the present moment environment. Recommendations can be content based, wherein the recommendation in the form of that useful for augmented reality processing. Alternatively, recommendations can be rendered as instructions or contextually based, intended to provide basic context information in relation to an augmented reality application 113. Generally, the step of generating a recommendation is only necessary in response to detected content available in the bounded area of the ad-hoc mesh network 109 and/or perceived adverse/unexpected behavior of another node participating within the mesh network 109. Hence, in some instances, this step is not performed.

For example, in the context of the hunting use case described above, the recommendation may include identifying what locations are safe for the user to hunt or occupy given the distribution of nearby hunters. In the search and rescue content, the recommendations may include recommending the movements of potential searchers to more efficiently cover the entire search area without unnecessarily revisiting previously search areas.

Next, a message body is generated by at least one node 101 and prepared for broadcast to the other nodes 101 within the mesh network 109 if any (steps 405 and 407 respectively). The prepared message may include, but is not limited to, location information of one or more of the nodes 101, specific content data, header information, metadata, reference tags and any other data for conveyance to a receiving node within the mesh network 109. More specifically, the message may include content intended to enable corresponding augmented reality applications 113 (e.g., video, imagery, textual data) operable on participating nodes 101 to convey relevant, consistent, useful data pertaining to the environment at hand.

In instances where a network storage device is available (step 409), as is common in the more traditional client/server paradigm, the message generated by the node can be transmitted to the network storage device 411. In one embodiment, whether the message is transmitted to the network storage device 411 is based a determination of the number of density of the nodes 101 within the bounded area of the ad-hoc mesh network 109. More specifically, if the density of the nodes 101 is below a predetermined threshold value, the message or content is transmitted to the network storage device 411. In this way, if the density is sufficiently low that there may not be enough nodes 101 present to ensure the content associated with the bounded area can be maintained in the nodes 101, then the content can be transmitted to the network storage device 411 until, for instance, a sufficient density of nodes 101 is restored. The storage device, therefore, serves as a data proxy through which the plurality of participating nodes 101 access content pertaining to any of the other nodes 101, when the content is not otherwise available directly from the nodes 101 themselves. Of course, with the concepts and teachings herein, no network storage device 411 is necessary given the presence of the ad-hoc mesh network 109 through which the nodes 101 collaborate. So, instead the message is broadcasted as a flooding message (step 413), causing it to be transmitted to all nodes within proximity of the mesh network. The augmented reality application 113, operating in conjunction with the mesh services module 111, is then notified of the transmission. If necessary, a determination can be made as to whether to rebroadcast the message based on rebroadcast criteria (e.g., counting rebroadcasts by other nodes, lack of acknowledgements, etc.) (steps 415 and 417). If a broadcast is not necessary, the augmented reality application 113 notified and the process 400 ends.

In the process 420 of FIG. 4B, a node 101 receives a flooding message from another over the mesh network 109 (step 421). Alternatively, the node 101 specifies an item (e.g., an object, person, animal, etc.) to track or search for within the bounded area (step 423). Once the specification is broadcast, the node then receives one or more reports from the corresponding one or more nodes (step 425). In response, the node 101 can receive and/or aggregate one or more reports from itself or the other nodes 101, wherein the reports relate to information associated with to the specified item. For example, the report may include a message indicating an observed location, directional heading, speed, etc. of the item, which can then be shared and/or compared with other reports from other nodes 101 to track or locate the item. In another embodiment, the report may include media files (e.g., captured images, videos, audio, etc.) of the item. In yet another embodiment, the reports may be used as part of a search function, wherein multiple nodes 101 cooperate to search of an item. Next, as before, location, directional heading, tilt angle, speed, an object associated with one of the nodes or a combination thereof is retrieved for the node in question (step 427), followed by a determination as to the location/relative radio distance of neighboring wireless nodes (step 429).

As a next step, a determination is made as to what areas within the bounded area (associated with the relevant content and/or specified item) were previously visited amongst the one or more nodes (step 431) based, at least in part, on the reports and/or the information retrieved in steps 427 and 429. This information is useful, among other things, for enabling persistent interaction and conveyance of movement activity amongst nodes over time within the bounded area. As other nodes 101 join or exit the search area (step 433), the node 101 can receive additional reports from the nodes 101 within the bounded area. Accordingly, a determination is performed to identify if any nodes 101 have since exited from the bounded area (step 433). If yes, a request is sent to the responding node 101 to remove content from the exited nodes 101 (step 435). If no, the active node 101 generates a recommendation for new search areas, search vectors or a combination thereof (step 437) based on updated reports from the new set of nodes 101 within the bounded area.

In certain embodiments, the system 100 can initiate or request removal of content associated a bounded area once a node 101 containing the content exits or leaves the bounded area. As noted previously, such content is typically very specific to a location and/or time at the location, and therefore, the content may be of little value when the node 101 is no longer within the bounded area. By initiating or suggesting removal the content, the system 100 advantageously reduces or eliminates the resource burden (e.g., storage space on the device, computing resources associated with storage, etc.) associated with storing information that may no longer be of relevance to a particular node 101. It is noted that when the node 101 returns to the bounded area, the node 101 may retrieve the content from other nodes 101 within the same bounded area to restore the content. Moreover, although the exiting procedure for a node 101 is described in the context of a search function, the same exiting procedure can be applied any time a node 101 the bounded area.

Finally, the node 101 can present the reports and/or corresponding recommendations as context information for an augmented reality application 113, other location-based applications (e.g., navigation applications, mapping applications), or the like. More specifically, the augmented reality application 113 of the node 101 in question causes presentation of at least one of the location, the directional heading, the tilt angle, the speed, the areas within the bounded area that were previously visited, the reports, and the recommendation for the new search areas, the search vectors, or the combination thereof on a mapping user interface (step 439). By of example, the user interface can feature virtual elements in alignment with other information displayed to the user. Optionally, the user can perform the steps of FIG. 4A (step 441) again if necessary.

In summary, the steps of FIGS. 4A-4B ultimately enable the one or more nodes 101 to collect appropriate context data, generate related content, transmit and receive such data and content, and ultimately render such data for display amongst the plurality of nodes within the context of the shared environment.

As noted previously, in one embodiment, the approach described herein may be used to conduct search and/or rescue operations for lost items, people, animals, etc. In this scenario, one or more of the nodes 101 may establish a search boundary corresponding to an area of the ad-hoc mesh network 109. In one embodiment, the one or more nodes 101 may distribute a message to enlist other nodes 101 and/or users associated with the nodes 101 to engage in a search for a particular item. The responding nodes 101 may then be organized as a search group in which search information is shared and associated with specific search area over the ad-hoc mesh network 109. In one embodiment, the participating nodes 101 may be authenticated (e.g., network address filtering, username/password, biometric security, etc.) to ensure that only authorized nodes 101 are able to access the search information.

Once the search is underway, the locations, heading, speed, etc. of the participating nodes 101 can be tracked using, for instance, Global Positioning System (GPS) receivers or other location-based sensors or services, and then shared with the other participating nodes 101. In this way, the already searched areas of the search perimeter are shared with other nodes 101 and presented on, for instance, a mapping user interface. In one embodiment, in order to reduce power consumption by the respective displays of the nodes 101, the colors, brightness, etc. of the displays can be tuned accordingly.

In another embodiment, the searching maybe performed using one or more sensors (e.g., cameras, microphones, heat sensors, etc.) that may be part of or connected to the nodes 101. Moreover, each of the nodes 101 may estimate the already search area and the accuracy of the estimation according to the combined data from different sensors In various embodiments, any of several additional features may also be incorporated into the ad-hoc mesh network 109 based search use case such as: (1) estimating the likelihood that the item being search for (e.g., a moving item or person) has escaped or left the search area based on reports of the items estimated speed and type of movement (e.g., walking, flying, biking, driving, etc.); (2) using the search feature as a hide-and-seek game; (3) tracking the item using signals (e.g., and/or transponders; (4) associating one or more of the nodes 101 with a tracking animal (e.g., a search dog); (5) preregistering potential search nodes 101 so that a search group can be quickly organized; and the like.

In yet another embodiment, the search function may be extended to other activities that can benefit from the ability to track previously visited areas within a larger bounded area. For example, farmers can use the tracking capability to organize a group of people to harvest crops from an area of the farm. In another example, census takers can track what areas have already been canvassed within a particular neighborhood. In another example, health workers can track what areas have already received vaccinations, medicine, check-ups, etc.

Figure 5:
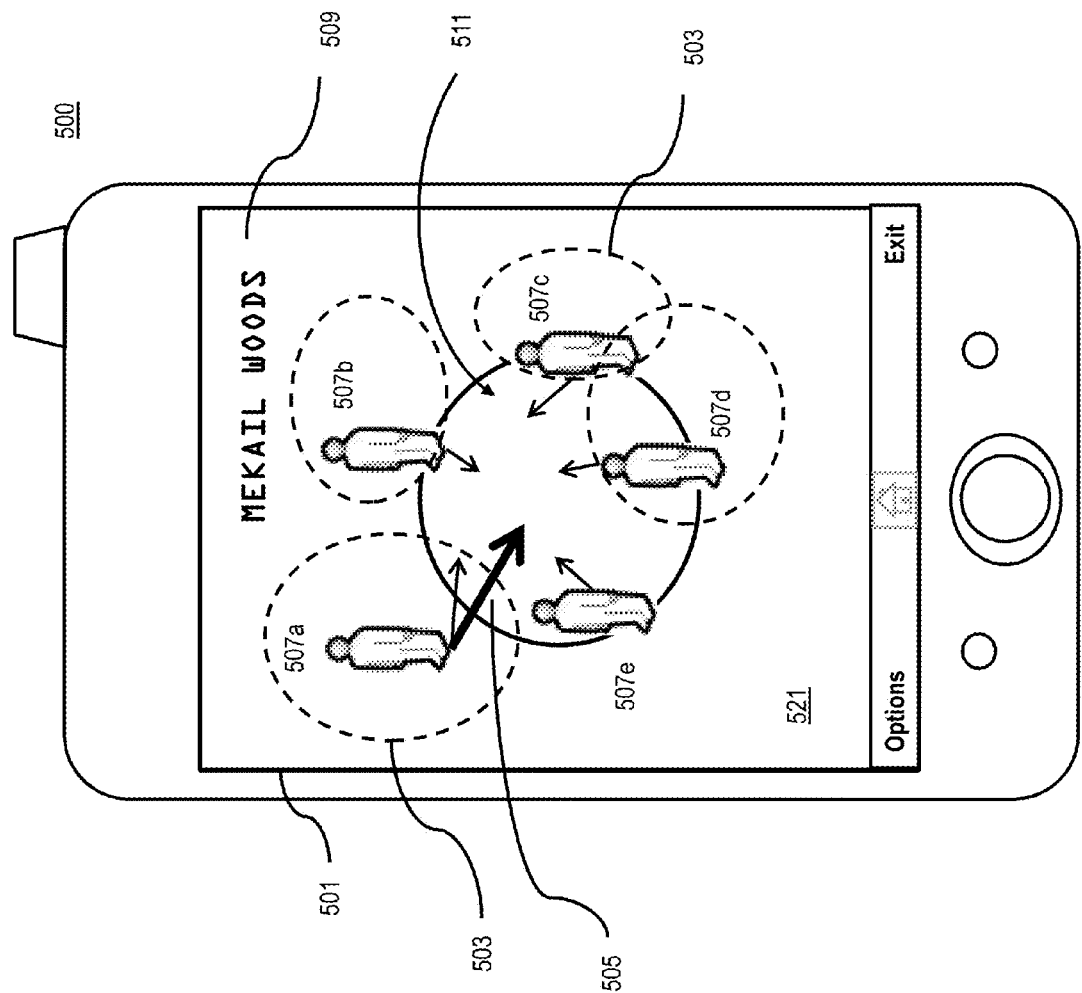
FIG. 5 is a diagram of an application interface operable within user equipment used to implement an embodiment of the invention.

FIG. 5 is a diagram of an application interface operable within user equipment as used to implement an embodiment of the invention. In this example, the user equipment is a smartphone 500 equipped with a graphical user interface 501. The graphical user interface 501 presents an augmented reality application 521 for displaying a mapped representation of Mekail Woods 509 (e.g., corresponding to a bounded area of the mesh network 109) with users 507 engaged in the seeking of items within a select area of coverage 511 within the map. In particular, the application is intended to depict to the user of the smartphone 500 the change in movements and/or activities of each user. The exemplary application also makes recommendations to the users regarding an optimal direction they should consider. Each individual user would experience a similar representation to their respective user interfaces.

User 507a is presented as a virtual element representing the user associated with the smartphone 500, while users 507b-507e represent users of other wireless devices who interact via the mesh network. Also represented are one or more virtual elements 503 for depicting the area already covered by a given user. Each user's current direction is shown, represented in the illustration as the smaller arrow pointing away from each respective user 507. While not shown expressly, the user may select from various user interface buttons to engage in various ways with the data presented to the screen or to interact with other mesh network participants. Alternatively, there user can select various features from the options link within the toolbar. For example, the user 507a may select a function to have the augmented reality application 521 generate a representation of an optimal direction. This determination would be based at least in part on awareness information as obtained relative to the other user's devices, context data as determined and other factors. Alternatively, the determination can be persistently provided by the user device via the application 521 without prompting. In either case, as a result, the optimal direction for the user 507a is presented as bold arrow 505.

The processes described herein for providing augmented reality client application content to be enabled for one or more nodes within a bounded area of a mesh network may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
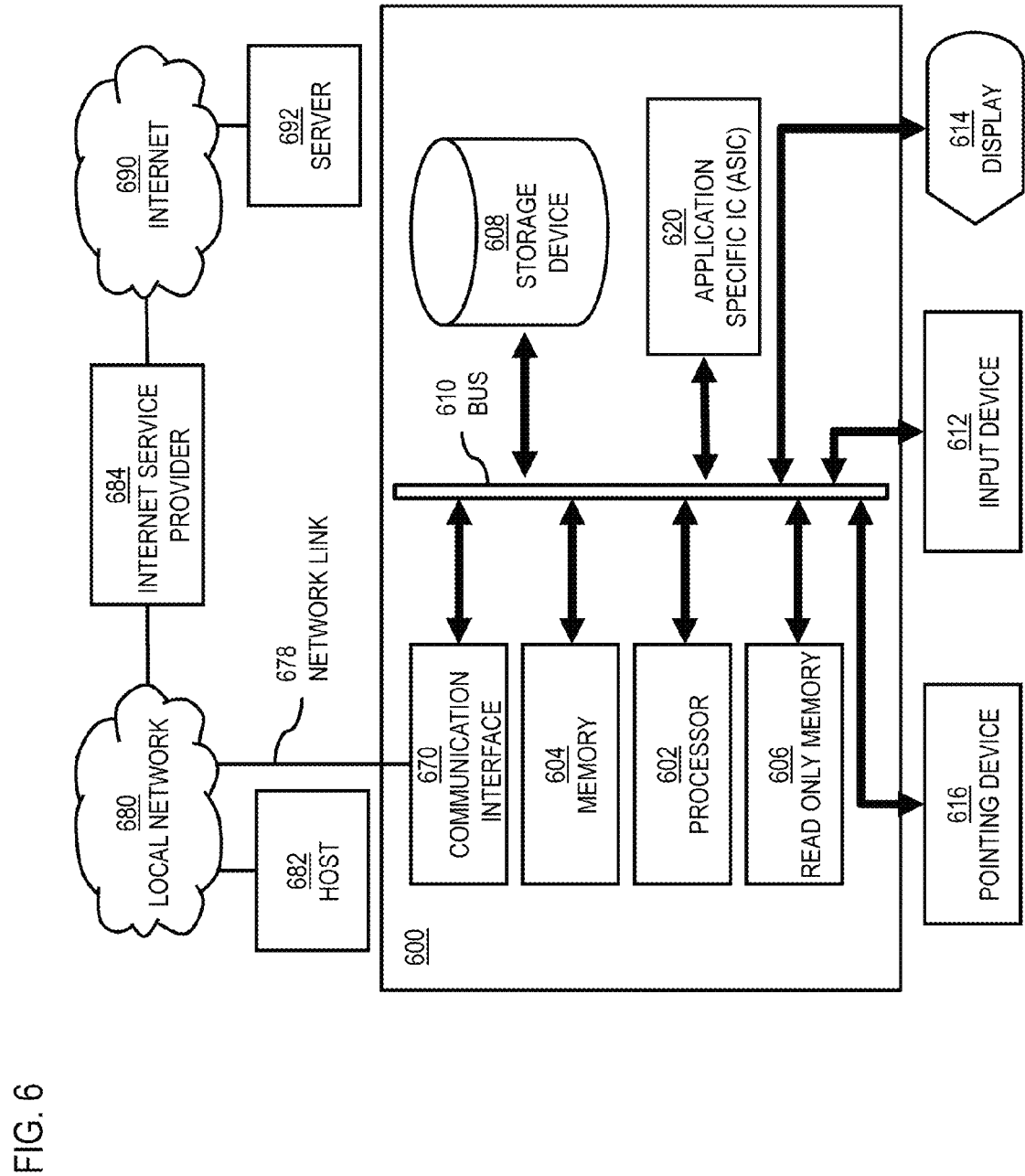
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide seeded modeling of user interests as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing seeded modeling of user interests.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide seeded modeling of user interests. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing seeded modeling of user interests. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing seeded modeling of user interests, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 223 for providing seeded modeling of user interests to the UE.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
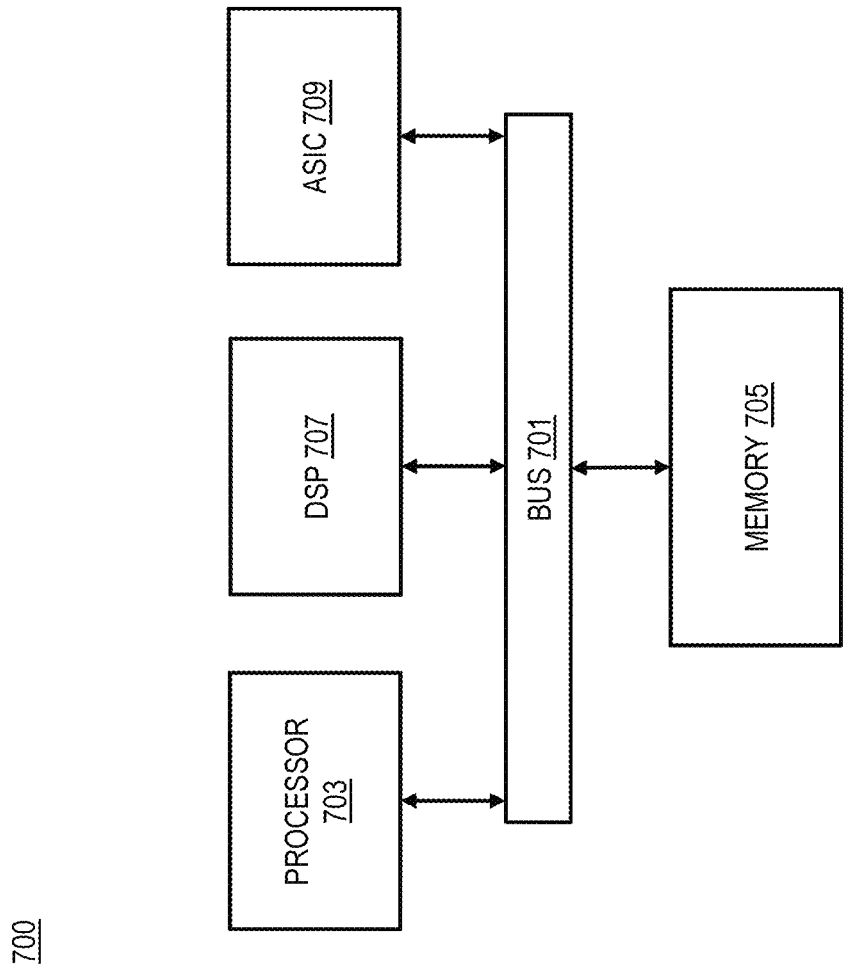
FIG. 7 is a diagram of a chip set that can be used to implement an embodiment of the invention.

FIG. 7 illustrates a chip set or chip 700 upon which an embodiment of the invention may be implemented. Chip set 700 is programmed to provide seeded modeling of user interests as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of providing seeded modeling of user interests.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide seeded modeling of user interests. The memory 705 also stores the data associated with or generated by the execution of the inventive steps.

Figure 8:
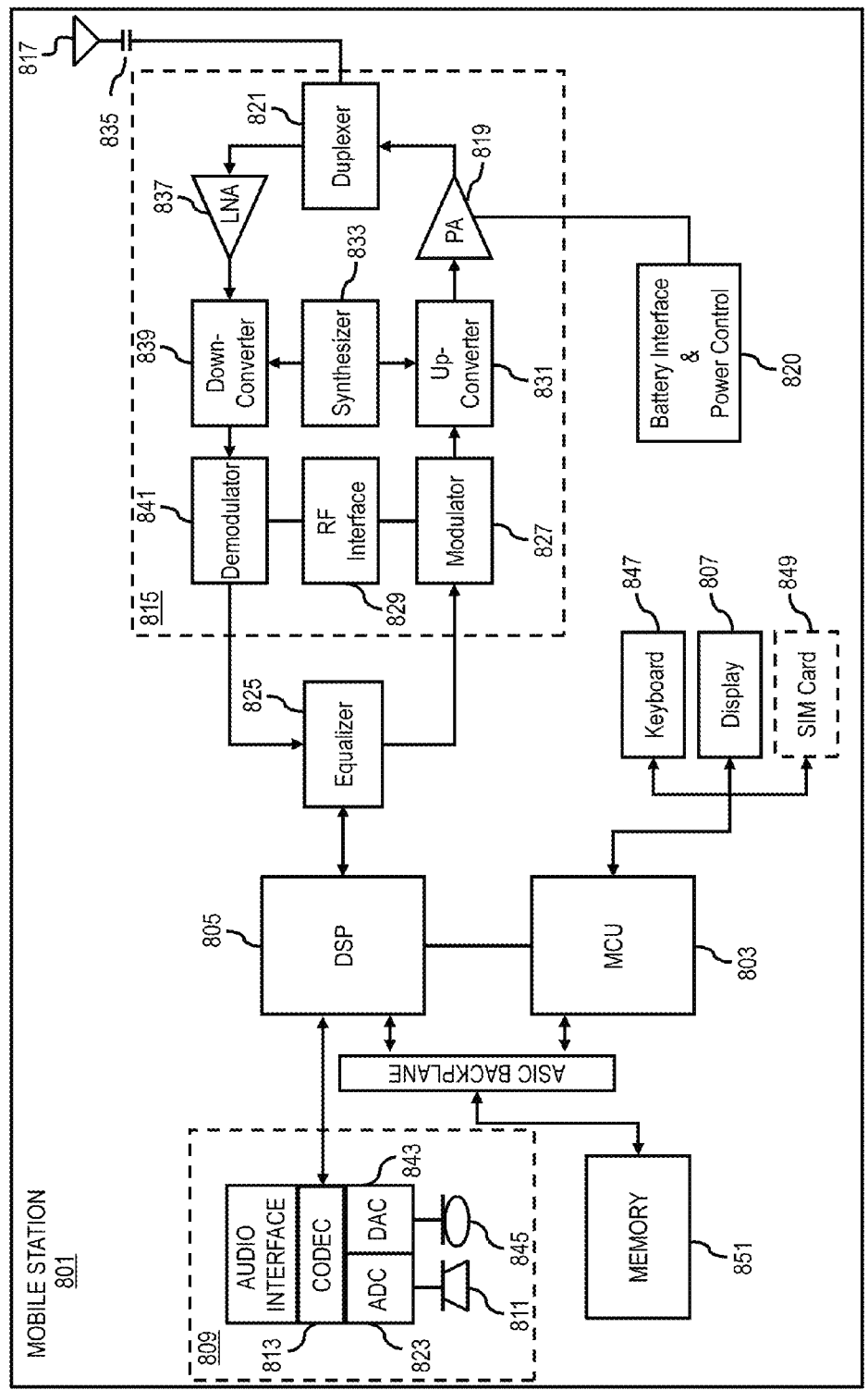
FIG. 8 is a diagram of a mobile terminal (e.g., handset) that can be used to implement an embodiment of the invention

FIG. 8 is a diagram of exemplary components of a mobile terminal (e.g., handset) for communications, which is capable of operating communication network 223, according to one embodiment. In some embodiments, mobile terminal 800, or a portion thereof, constitutes a means for performing one or more steps of providing seeded modeling of user interests. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing seeded modeling of user interests. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide seeded modeling of user interests. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   sharing sensor data among a plurality of user devices over an ad-hoc mesh network, wherein the sensor data includes (1) a location, a directional heading, a tilt angle, and a speed of each of the user devices, and (2) a location of a real-world object tracked by one or more sensors of the user devices, one or more users of the user devices, or a combination thereof;
   determining a bounded area covered by the ad-hoc mesh network and shared by the user devices;
   associating locations visited by the user devices within the bounded area into one or more visited regions; and
   initiating, at each of the user devices, a presentation that overlays graphic elements of the one or more visited regions, of the real-world object, and of the user devices atop a map of the bounded area based on the respective locations.

2. A method of claim 1, wherein the sensor data further includes one or more sensor types, and the method further comprising:
   estimating the one or more visited regions using the sensor data; and
   determining accuracy of the estimating based, at least in part, on the one or more sensor types.

3. A method of claim 2, wherein the ad-hoc mesh network operates using one or more short range radio connections.

4. A method of claim 1, further comprising:
   generating a recommendation for new search areas, search vectors, or a combination thereof based, at least in part, on the one or more visited regions; and
   notifying at least one of the user devices of the recommendation.

5. A method of claim 1, wherein the presentation is generated using an augmented reality application, and the presentation further includes the sensor data.

6. A method of claim 5, further comprising:
   determining whether the real-world object has left the bounded area based on the location, a directional heading, a speed, a movement type, or a combination thereof, of the real-world object.

7. A method of claim 1, wherein the map is an aerial view of the bounded area.

8. A method of claim 1, wherein the real-world object includes a tracking animal, an animal tracked by the tracking animal, or a combination thereof.

9. A method of claim 6, further comprising:
   selecting another bounded area determined by another group of user devices, another group of users of the another group of user devices, or a combination thereof, and searching for the real-world object based on the location, the directional heading, the speed, the movement type, or a combination thereof, of the real-world object, after determining that the real-world object has left the bounded area.

10. A method of claim 5, further comprising:
    associating each of the users with a membership class,
    determining a portion of the sensor data to be presented on a respective user device based on the membership class.

11. An apparatus comprising:
    at least one processor; and
    at least one memory including computer program code,
    the at least one memory and the computer program code configured to, with the at least one processor, cause the apparatus embedded in a user device to perform at least the following,
    sharing sensor data among a plurality of user devices over an ad-hoc mesh network, wherein the plurality of user devices include the user device, and wherein the sensor data includes (1) a location, a directional heading, a tilt angle, and a speed of each of the user devices, and (2) a location of a real-world object tracked by one or more sensors of the user devices, one or more users of the user devices, or a combination thereof;
    determine a bounded area covered by the ad-hoc mesh network and shared by the user devices;
    associate locations visited by the user devices within the bounded area into one or more visited regions; and
    initiate a presentation that overlays graphic elements of the one or more visited regions, of the real-world object, and of the user devices atop a map of the bounded area based on the respective locations.

12. An apparatus of claim 11, wherein the sensor data further includes one or more sensor types, and the apparatus is further caused to:
  estimate the one or more visited regions using the sensor data; and
  determine accuracy of the estimating based, at least in part, on the one or more sensor types.

13. An apparatus of claim 12, wherein the ad-hoc mesh network operates using one or more short range radio connections.

14. An apparatus of claim 11, wherein the apparatus is further caused to:
  generate a recommendation for new search areas, search vectors, or a combination thereof based, at least in part, on the one or more visited regions; and
  notify at least one of the user devices of the recommendation.

15. An apparatus of claim 11, wherein the presentation is generated using an augmented reality application, and the presentation further includes the sensor data.

16. An apparatus of claim 15, wherein the apparatus is further caused to:
  determine whether the real-world object has left the bounded area based on the location, a directional heading, a speed, a movement type, or a combination thereof, of the real-world object.

17. An apparatus of claim 11, wherein the map is an aerial view of the bounded area.

18. An apparatus of claim 11, wherein the real-world object includes a tracking animal, an animal tracked by the tracking animal, or a combination thereof.

19. An apparatus of claim 16, wherein the apparatus is further caused to:
  select another bounded area determined by another group of user devices, another group of users of the another group of user devices, or a combination thereof, and searching for the real-world object based on the location, the directional heading, the speed, the movement type, or a combination thereof, of the real-world object, after determining that the real-world object has left the bounded area.

20. An apparatus of claim 19, wherein the apparatus is further caused to:
  associate each of the users with a membership class,
  determine a portion of the sensor data to be presented on a respective user device based on the membership class.

\* \* \* \* \*